(12) United States Patent
Noordhuis et al.

(10) Patent No.: US 7,779,749 B2
(45) Date of Patent: **\*Aug. 24, 2010**

(54) DEVICE FOR PREPARING A BEVERAGE SUITABLE FOR HUMAN CONSUMPTION WITH A FINE-BUBBLE FOAM LAYER

(75) Inventors: Joeke Noordhuis, Hoogeveen (NL); Jacob Willem Zijlstra, Woerden (NL)

(73) Assignee: Koninklijke Philips Electronics N.V., Eindhoven (NL)

( \* ) Notice: Subject to any disclaimer, the term of this patent is extended or adjusted under 35 U.S.C. 154(b) by 858 days.

This patent is subject to a terminal disclaimer.

(21) Appl. No.: 10/581,352

(22) PCT Filed: Dec. 10, 2004

(86) PCT No.: PCT/IB2004/052759

§ 371 (c)(1),
(2), (4) Date: Jun. 1, 2006

(87) PCT Pub. No.: WO2005/058109

PCT Pub. Date: Jun. 30, 2005

(65) Prior Publication Data

US 2007/0079707 A1     Apr. 12, 2007

(30) Foreign Application Priority Data

Dec. 11, 2003     (EP)     ................... 03104653

(51) Int. Cl.
*A23L 1/00*     (2006.01)
*B41L 3/10*     (2006.01)

(52) U.S. Cl. .......................................... 99/275; 426/77

(58) Field of Classification Search ................... 99/275, 99/276–323.3; 426/77, 78–84
See application file for complete search history.

(56) References Cited

U.S. PATENT DOCUMENTS 7,237,475 B2 \* 7/2007 Chen et al. ................. 99/302 R
7,503,254 B2 \* 3/2009 Noordhuis ................... 99/295

FOREIGN PATENT DOCUMENTS

DE     102 47 573     4/2003
EP     0 878 158     11/1998
EP     1 371 311     \* 12/2003

\* cited by examiner

*Primary Examiner*—Daniel Robinson

(57) ABSTRACT

The invention relates to a device (1) for preparing a beverage suitable for human consumption and having a fine-bubble foam layer. The device is provided with a beverage unit (2) for delivering the beverage under pressure and at least one nozzle (4) which is in fluid communication with the beverage unit for supplying the beverage to the nozzle such that the nozzle can generate a jet (12) of beverage. The device further comprises a receiving unit (14) into which the jet is directed for obtaining the beverage with the fine-bubble foam layer. The receiving unit is provided with a chamber (16) with at least one drain opening (18) for delivering the beverage with the fine-bubble foam layer and a jet impact member (20) accommodated in the chamber and having a top (22) that lies free from an inner wall (24) of the chamber. The nozzle and the jet impact member are mutually oriented such that-the jet hits against a portion of the top of the jet impact member, so that the jet after hitting against the jet impact member forms a mist of the beverage. The beverage with the fine-bubble foam layer subsequently leaves the drain opening. The device is constructed such that air (34) can only be supplied to the chamber through the at least one drain opening and/or through an air supply channel which extends through the jet impact member into the chamber.

28 Claims, 10 Drawing Sheets

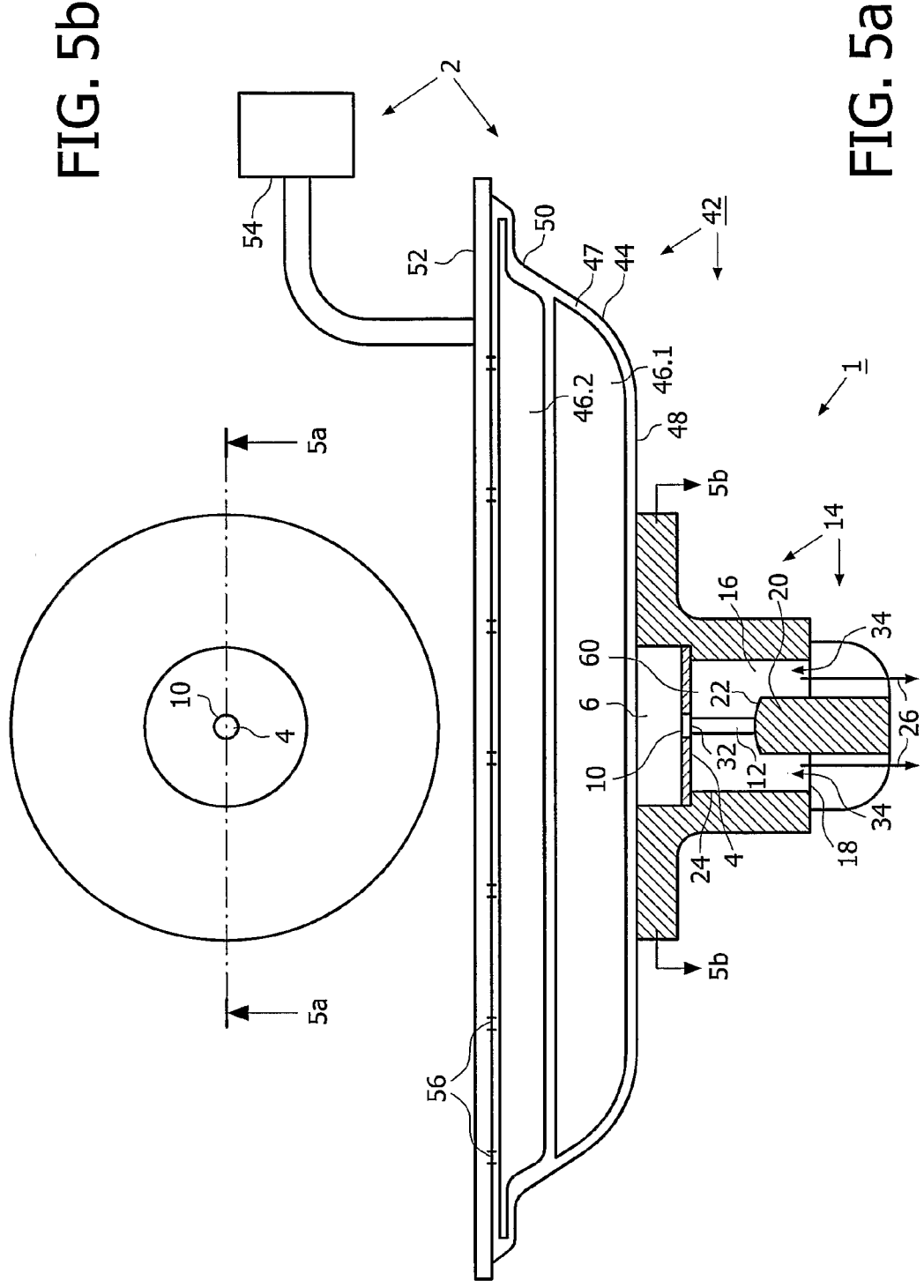

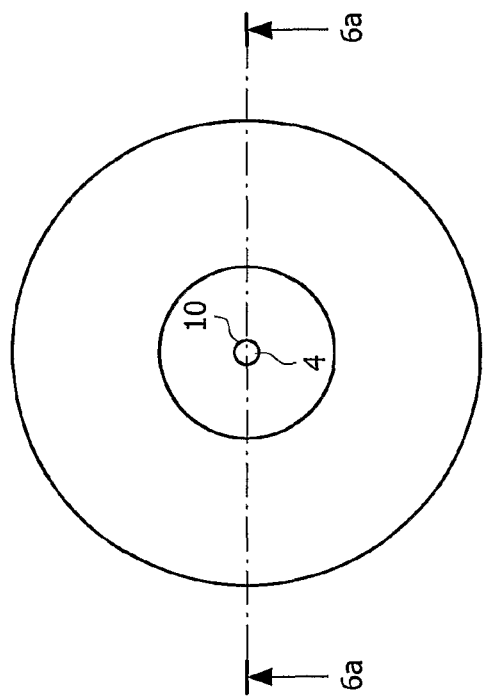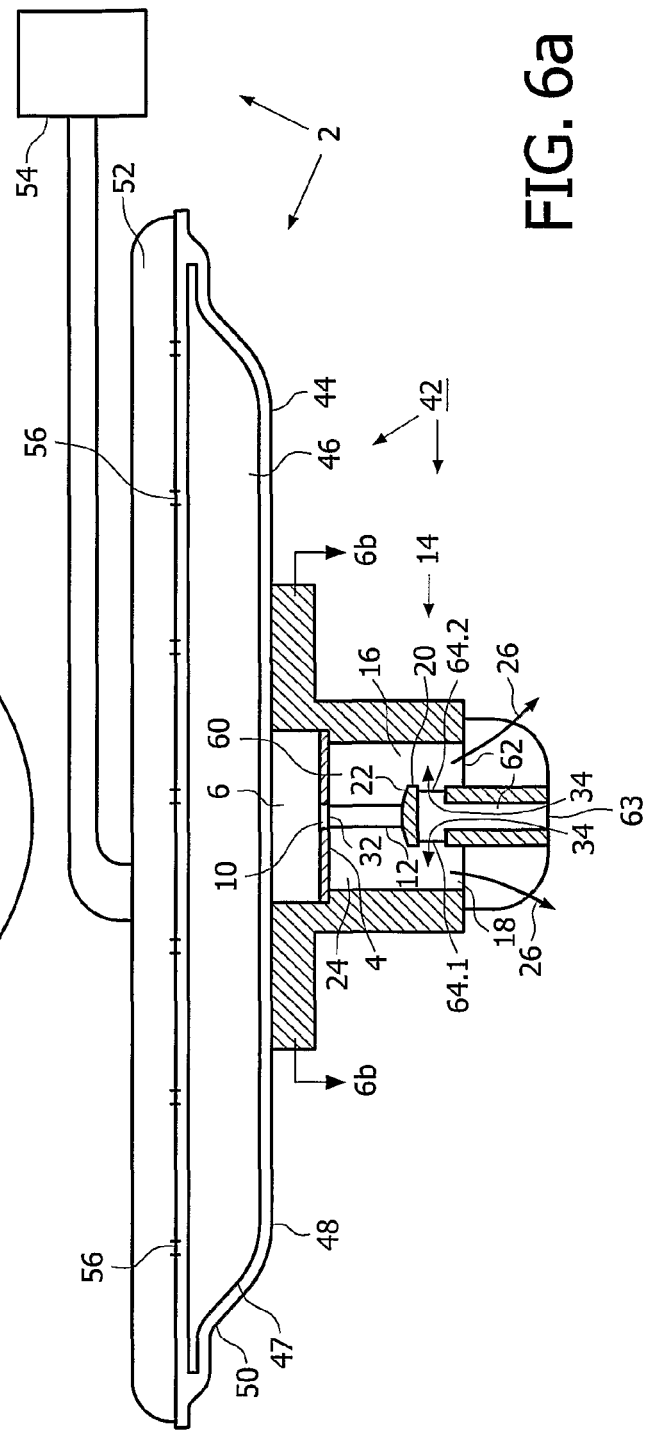

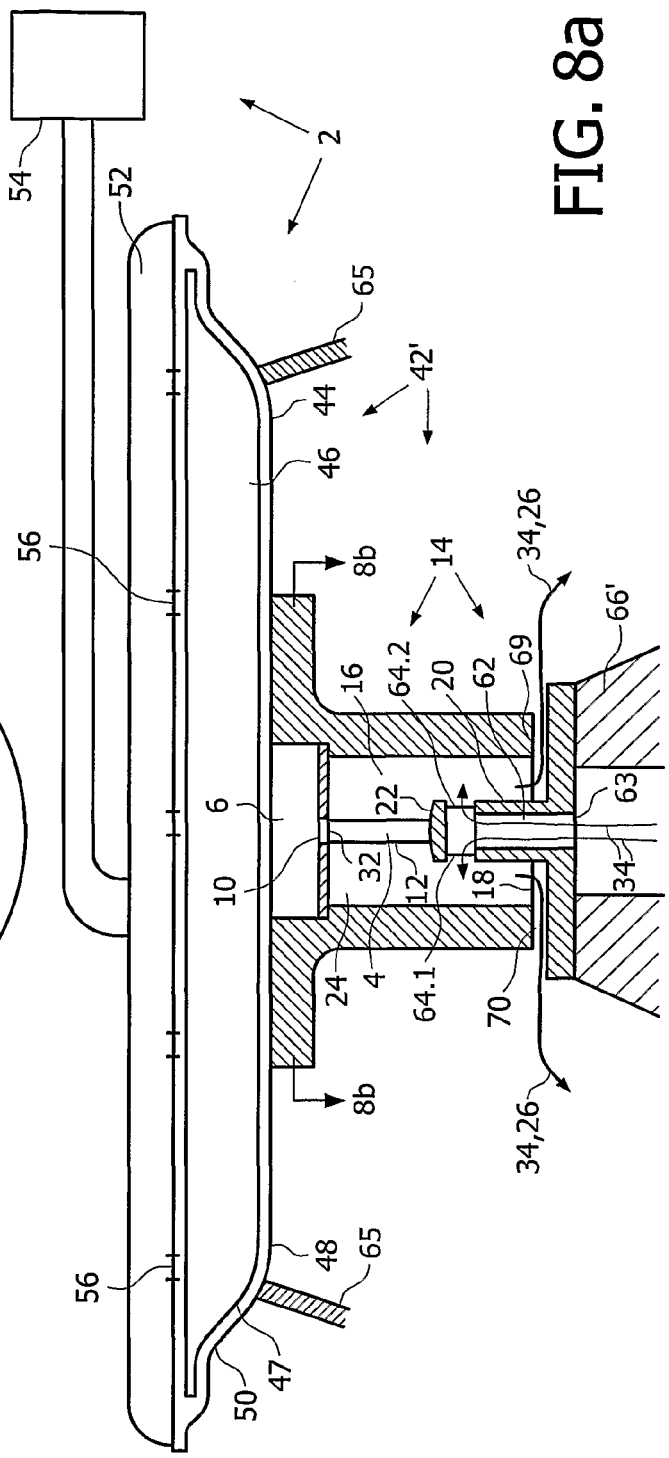
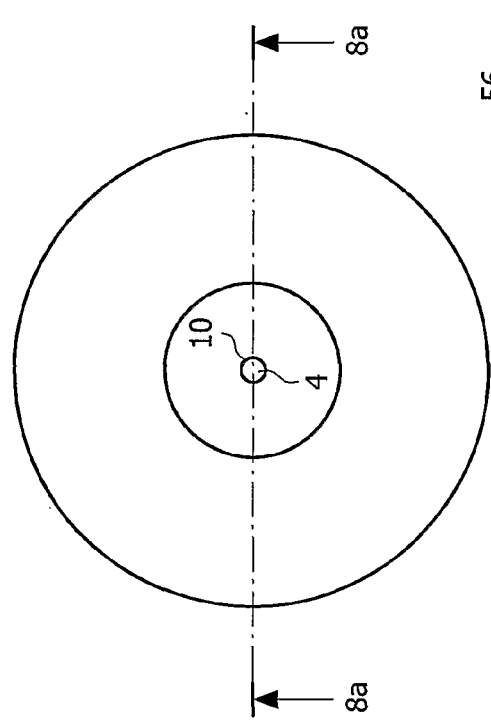
FIG. 8b
FIG. 8a

A-A

DEVICE FOR PREPARING A BEVERAGE SUITABLE FOR HUMAN CONSUMPTION WITH A FINE-BUBBLE FOAM LAYER

The invention relates to a device for preparing a beverage suitable for human consumption with a fine-bubble foam layer, such as coffee or milk with a fine-bubble foam layer, provided with a beverage unit for supplying the beverage under pressure, at least one nozzle which is in fluid communication with the beverage unit for supplying the beverage to the nozzle such that the latter can generate a jet of the beverage, and a receiving unit into which the jet is directed for obtaining said beverage with the fine-bubble foam layer.

The invention also relates to a method of preparing a beverage suitable for human consumption with a fine-bubble foam layer, such as coffee or milk, in which method a liquid jet comprising the beverage is generated and said liquid jet is supplied to a receiving unit such that the jet enters the receiving unit under pressure for obtaining the beverage with the fine-bubble foam layer.

The invention further relates to a unit provided with such a receiving unit and a holder for accommodating a product to be extracted and/or to be dissolved, such as coffee, tea, and/or a dairy creamer.

The invention further relates to a unit provided with a part of such a receiving unit and a holder for accommodating a product to be extracted and/or to be dissolved such as coffee, tea, and/or a dairy creamer.

The invention further relates to an assembly of such a unit and a pad which is accommodated in the holder of the unit.

Such a device and such a method are known from a possible embodiment of a device from European patent application EP 0 878 158.

In the known device, the receiving means are provided with a buffer reservoir which comprises a bottom with vertical side walls in this example. The jet is squirted into the buffer reservoir, which is thus filled with the beverage to be processed, during use. This creates a liquid surface in the buffer reservoir. The liquid jet is then squirted into the liquid surface, whereby air is beaten into the beverage so that a fine-bubble foam layer is generated. The buffer reservoir is further provided with an outlet arrangement for draining the beverage with the fine-bubble foam layer from the buffer reservoir.

Squirting of the beverage into the buffer reservoir stops after some time. The buffer reservoir will subsequently empty itself in this example. The buffer reservoir may for this purpose be provided with a specially adapted drain opening in the bottom of the buffer reservoir.

Although a beverage with a desired quality and a fine-bubble foam layer is formed in the known system, it is a disadvantage that it takes some time before the buffer reservoir has fully emptied. It is especially the accompanying final dripping that may occupy a comparatively long period of time. For example, if one cup of coffee is prepared in the known device by the known method, the emptying of the buffer reservoir and the final dripping may take half a minute. Final dripping itself may take 20 seconds. In addition, the known system has bulky dimensions.

The invention has for its object to provide a device and a method by which the problem identified above can be counteracted, if so desired.

The device according to the invention is for this purpose characterized in that the receiving unit is provided with a chamber having at least one drain opening for delivering the beverage with the fine-bubble foam layer and a jet impact member accommodated in the chamber and having a top which lies free from an inner wall of the chamber, the nozzle and the jet impact member being mutually oriented such that the jet hits against at least a portion of the top of the jet impact member so that the beverage, after hitting against the jet impact member, leaves the chamber through the at least one drain opening in the form of the beverage with the fine-bubble foam layer, while the device is constructed such that air can be supplied to the chamber exclusively through said at least one drain opening and/or through an air inlet channel which extends through the jet impact member into the chamber.

Since no fluid level needs to be built up in the chamber of the device according to the invention, said chamber can be emptied comparatively quickly, if so desired, after the jet has stopped squirting into the chamber, in which case final dripping will be comparatively short. It is merely necessary that the at least one drain opening of the chamber should be sufficiently large for obtaining a comparatively short final dripping time. This drain opening can be made sufficiently large, if so desired, in order to shorten the final dripping period. It is also possible to construct such a device with comparatively small dimensions.

If air is supplied to the chamber exclusively through the at least one drain opening and/or through an air supply channel extending through the jet impact member, it is found that a beverage with a rich, fine-bubble foam layer is obtained. The chamber can be inexpensively manufactured, if so desired, in that the chamber itself is not provided with an air supply opening other than the drain opening and/or said air supply channel.

It holds in particular that the chamber is provided with a product feed opening through which the jet generated by the nozzle is fed to the chamber during use.

It preferably holds here that the product feed opening is formed by the nozzle.

Such a construction is simple without having adverse effects on the satisfactory operation of the device.

Furthermore, it preferably holds that a space within the chamber between the nozzle and the jet impact member is free from restrictions that hamper a flow of the beverage between the nozzle and the jet impact member.

Furthermore, it is true in particular that the top is at least substantially directed towards the nozzle. The impact of the jet against the top can be comparatively strong as a result of this, so that the beverage is atomized into very fine particles after the impact. It is preferably true here that the top of the jet impact member is present between the product feed opening and the drain opening. Preferably, furthermore, the top is at least substantially directed towards the product feed opening.

It is true in particular that a surface of the top is concave, convex, or planar. It is found for a convex surface of the top that a mist is obtained with droplets which are substantially homogeneous as regards their diameter. This is found to promote the creation of a homogeneous, fine-bubble foam layer.

It is preferably true that a line perpendicular to the surface of the top in a location where the jet hits the top is at least substantially parallel to said jet. As a result, the jet will at least substantially be incident perpendicularly to the surface, in which case the interaction between the jet and the surface is at its greatest. In other words, the velocity component of the jet in the direction of the perpendicular is equal to the velocity of the jet itself, i.e. a maximum.

The method according to the invention is characterized in that the receiving unit is provided with a chamber with at least one drain opening for delivering the beverage with the fine-bubble foam layer and a jet impact member accommodated in the chamber and having a top which lies free from an inner wall of the chamber, wherein the jet is directed such that the jet hits against a portion of the top of the jet impact member, wherein the beverage after hitting the jet impact member leaves the chamber through the at least one drain opening as the beverage having the fine-bubble foam layer, and wherein air is supplied to the chamber exclusively through the at least one drain opening and/or through an air supply channel which extends through the jet impact member into the chamber.

A possible unit according to the invention is provided with a receiving unit and a nozzle of the device as claimed in any one of the claims 1 to 28, as well as a holder for accommodating a product to be extracted and/or to be dissolved, such as coffee, tea, and/or a dairy creamer, wherein the holder, the chamber, the jet impact member, and the nozzle are mechanically connected to one another, while the holder comprises at least an outlet which is in fluid communication with an inlet of the nozzle.

Another possible unit according to the invention is provided with a chamber and a nozzle of the device as claimed in any one of the claims 1 to 28, as well as a holder for accommodating a product to be extracted and/or to be dissolved, such as coffee, tea, and/or a dairy creamer, wherein the holder, the chamber, and the nozzle are mechanically connected to one another, while the holder comprises at least one outlet which is fluid communication with an inlet of the nozzle.

The assembly according to the invention comprises a unit as claimed in any one of the claims 59 to 64 and at least one pad which comprises an envelope of filter paper and which is filled with the product to be extracted and/or to be dissolved, which pad is accommodated in the holder such that it extends over a bottom of the holder up to a raised side wall of the holder.

The invention will now be explained in more detail with reference to the drawing, in which:

FIG. 4b is a bottom view of the device of FIG. 4a;

FIG. 5a is a cross-sectional view of a fourth embodiment of a device according to the invention, a unit according to the invention which is provided with a holder, a nozzle, and a receiving unit, as well as an assembly according to the invention which is provided with the unit, at least one pad being accommodated in the holder of the unit;

FIG. 5b is a cross-sectional view of the device of FIG. 5a;

FIG. 6a is a cross-sectional view of a fifth embodiment of a device according to the invention, a unit according to the invention which is provided with a holder, a nozzle, and a receiving unit, as well as an assembly according to the invention which is provided with the unit, at least one pad being accommodated in the holder of the unit;

FIG. 6b is a cross-sectional view of the device of FIG. 6a;

FIG. 7b is a cross-sectional view of the device of FIG. 7a;

FIG. 8a is a cross-sectional view of a seventh embodiment of a device according to the invention, a unit according to the invention which is provided with a holder, a nozzle, and a chamber of a receiving unit, and an assembly according to the invention which is provided with the unit, at least one pad being accommodated in the holder of the unit;

FIG. 8b is a cross-sectional view of the device of FIG. 8a;

FIG. 12b is a cross-sectional view of the nozzle of FIG. 12a.

Figure 1:
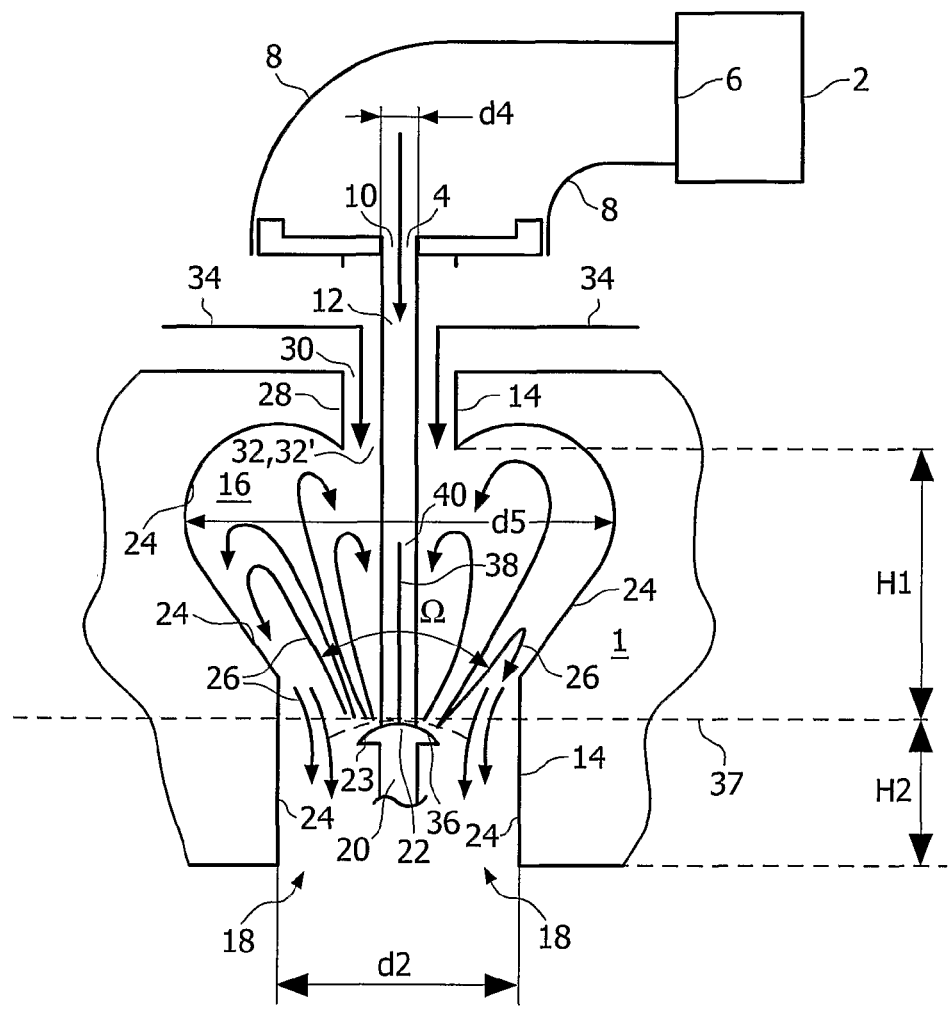
FIG. 1 is a cross-sectional view of an embodiment of a device not according to the invention for the preparation of a beverage suitable for human consumption and having a fine-bubble foam layer.

Reference numeral 1 in FIG. 1 denotes a device for preparing a beverage suitable for human consumption and having a fine-bubble foam layer, such as coffee or milk with a fine-bubble foam layer. The device 1 is provided with a beverage unit 2 for delivering a beverage suitable for human consumption, coffee in this example, under pressure. The device 1 is further provided with a nozzle 4. An outlet 6 of the beverage unit 2 is connected to an inlet 10 of the nozzle 4 by means of a tube 8. The nozzle 4 is thus in fluid communication with the beverage unit 2 for the delivery of the beverage to the nozzle 4. The nozzle 4 thus generates a jet 12 of beverage. The device 1 is further provided with a receiving unit 14 into which the jet 12 is directed so as to obtain the beverage with a fine-bubble foam layer. The receiving unit 14 is provided with a chamber 16 which comprises at least one drain opening 18 for delivering the beverage with the fine-bubble foam layer. The receiving unit 14 is further provided with a jet impact member 20 that is at least partly accommodated in the chamber 16. The jet impact member 20 has a top 22 which lies free from an inner wall 24 of the chamber and which is accommodated inside the chamber. The nozzle 4 and the jet impact member 20 are mutually oriented such that the jet 12 hits against at least a portion of the top 22 of the jet impact member 20, such that the beverage 26 after hitting the jet impact member leaves the chamber through the at least one drain opening in the form of the beverage with the fine-bubble foam layer. Surprisingly, air has been beaten into the beverage in the chamber 16 in such a manner that a beverage with a fine-bubble foam layer is obtained.

When hitting against the top 22 of the jet impact member 20, the jet 12 in this example will form a mist and/or turbulence of the beverage which flows against and/or along the inner wall 24 of the chamber 16 and subsequently leaves the chamber through the drain opening 18 as the beverage with the fine-bubble foam layer. It is achieved that the jet, when hitting against the top 22, forms a mist and/or turbulence of beverage which flows against and/or along the inner wall 24 of the chamber 16 in that the strength of the jet and the size of the chamber are mutually attuned. The jet must be sufficiently forceful and/or the chamber must be sufficiently small.

The moment the beverage unit 2 stops delivering the beverage under pressure to the nozzle 4, the formation of a mist of beverage in the chamber 16 will also stop. The chamber 16 will then be able to empty itself quickly through the drain opening 18. The drain opening 18 in this example has a diameter of 5 mm, with the result that the chamber 16 is empty within a few seconds. A long period (tens of seconds) during which the chamber 16 empties itself, including final dripping, does not occur here.

The receiving unit 14 in this example is provided with a channel 28 with an inlet opening 30 and an outlet opening 32. The outlet opening 32 in this example forms a product feed opening of the chamber 16 for the supply of the jet 12 to the chamber 16. The nozzle 4 in this example is at some distance from the inlet opening 30 of the channel 28. As a result, the jet 12 also sucks air 34 through the inlet opening 30 of the channel 28 into the chamber 16 during operation. The product feed opening 32 of the chamber 16 here at the same time acts as an air supply opening 32'.

Since a combination of the beverage jet and air is supplied to the chamber 16, air can be beaten into the beverage in cooperation with the generated stream of mist particles, whereby surprisingly a beverage with a fine-bubble foam layer is obtained. The air flow from the inlet opening 30 into the chamber 16 achieves that the mist particles cannot leave the chamber 16 through the inlet opening 30. The air flow as it were provides a sealing of the inlet opening 30 against mist particles in the chamber 16. It is thus prevented that the mist particles can move towards the nozzle 4 and interfere with the jet. The impact of the jet 12 against a portion of the top 22 creates said mist particles during operation. These mist particles will first move upward and sideways immediately after hitting against the top 22. A laminar and/or turbulent flow of mist particles thus arises in the chamber, which mist particles will still be able to flow against and/or along the inner wall 24. The force of gravity will then cause the mist particles to move downward. The mist particles subsequently form a liquid beverage again, into which air has been introduced such that a fine-bubble foam layer is formed, which beverage can subsequently leave the chamber 16 through the drain opening 18. The beverage is now ready for consumption.

It is true in this example that the top 22 of the jet impact member 20 is present between the air supply opening 32' and the drain opening 18. Furthermore, the top 22 is directed towards the nozzle 4. In this example, the top 22 is also located between the product feed opening 32 and the drain opening 18. It holds in particular that the top 22 is directed towards the product feed opening 32. A surface of the top 22 is convex in shape. It is found in this case that the mist particles formed after the impact initially move upwards distributed over a solid angle $\Omega$.

In this example, a line 38 perpendicular to the surface 36 of the top 22 in a position where the jet 12 hits the top 22 is at least substantially parallel to the jet 12. Furthermore, a perpendicular line 38 in the center of the surface 36 of the top 22 is at least substantially directed towards the nozzle 4 and towards the product feed opening 32. This perpendicular line, too, is at least substantially parallel to the jet. Moreover, a line 38 perpendicular to the surface 36 of the top 22 in the position where the jet 12 is incident is directed towards the product feed opening 32, and also towards the nozzle in this example. It is also true that the top 22 is in the center of the chamber 16, viewed in a plane 37 perpendicular to the jet. The inner wall 24 of the chamber 16 in this example is at least substantially rotationally symmetrical with respect to an axis of rotation 40. This axis in addition extends in a longitudinal direction of the chamber. Said center is a point of this axis of rotation 40 in this example. The jet impact member 20 in this example is in a lower portion of the chamber 16. The top is also present on the axis 40 of the chamber. The jet impact member 20 has a pole construction in this example. An axial direction of the pole-shaped member extends in a longitudinal direction of the chamber 16. The axis of rotation 40 mentioned above extends through the top 22. A rotationally symmetrical receiving unit 14 is thus obtained around the symmetrical axis of rotation 40 in this example.

In this example, the distance H1 from the product feed opening 32 to the top 22 is greater than the distance H2 from the top 22 to the drain opening 18 of the chamber 16. Also, in this example, H2 is greater than zero. Since the mist flow is especially formed in the chamber 16 between the top 22 and the product feed opening 32, a major portion of the chamber 16 can now be utilized for said laminar and/or turbulent flows of the mist.

Figure 2:
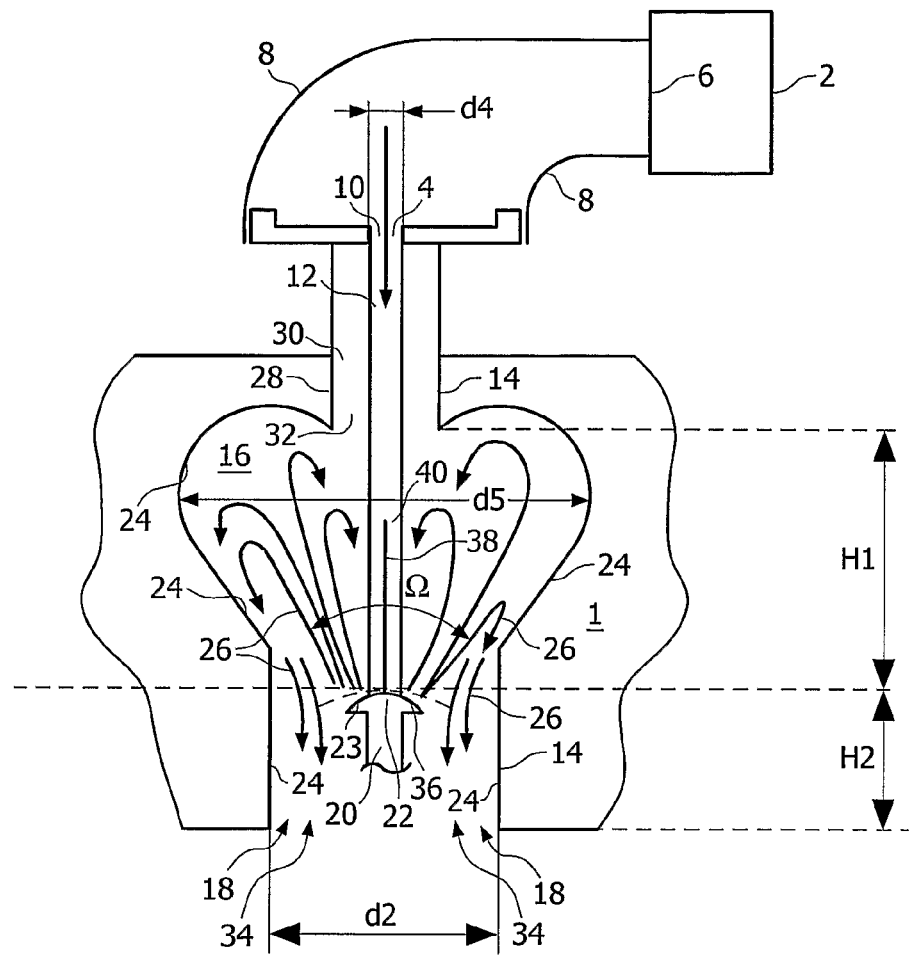
FIG. 2 is a cross-sectional view of a first embodiment of a device according to the invention for the preparation of a beverage suitable for human consumption and having a fine-bubble foam layer.

In FIG. 2, reference numeral 1 denotes a first embodiment of a device according to the invention. Components corresponding to those of FIG. 1 have been given the same reference numerals. Since the device of FIG. 2 largely corresponds to the device of FIG. 1, it is especially the differences between the devices of FIGS. 1 and 2 that will be discussed below.

The product feed opening 32 of the chamber in the device of FIG. 2 does not act as an air supply opening. The channel 28 here extends up to the nozzle 4. The air supply opening 32' is omitted.

This implies that the device is constructed such that air 34 can be supplied to the chamber 16 exclusively through the at least one drain opening 18. It is found that a beverage with a fine-bubble foam layer is obtained by means of the device of FIG. 2 with properties comparable to those of the beverage with the fine-bubble foam layer obtained with the device of FIG. 1. Since the air supply opening 32' can now be dispensed with, the device of FIG. 2 can be economically manufactured, if so desired. The nozzle 4 in this example is connected to the chamber via a fluid path extending from the nozzle to the product feed opening 32, which fluid path, formed by the channel 28 in this example, forms a closure for the outside air, with the result that in this example the air 34 can only be supplied to the chamber 16 through the at least one drain opening 18. The air will be sucked on in this example in that the beverage with the fine-bubble foam layer leaving the chamber 16 through the drain opening causes an air flow which leaves the chamber through the drain opening. This causes an underpressure in the chamber, with the result that at the same time air 84 is sucked into the chamber through the drain opening 18. This air flow accordingly compensates for the lost air carried along by the beverage when the latter leaves the chamber through the drain opening.

In FIG. 2, a cross-section of the chamber 16 is substantially heart-shaped. This, however, is not essential. This may be illustrated, for example, with reference to FIG. 3.

Figure 3:
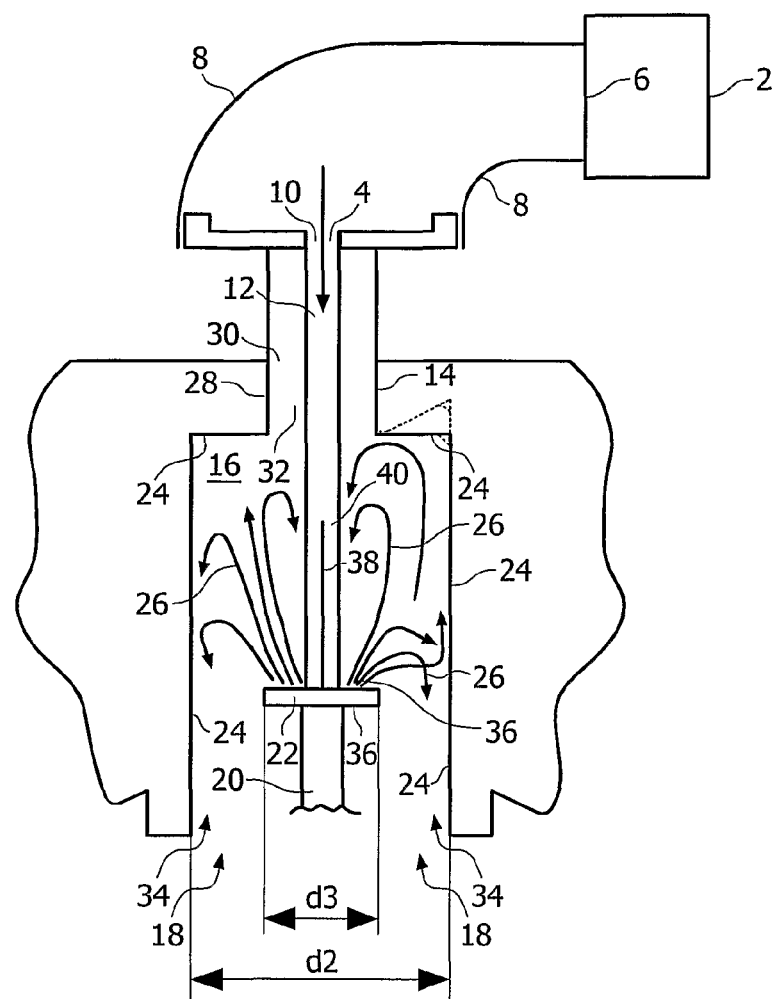
FIG. 3 is a cross-sectional view of a second embodiment of a device according to the invention for the preparation of a beverage suitable for human consumption and having a fine-bubble foam layer.

Components in FIG. 3 corresponding to those in FIG. 2 have been given the same reference numerals. An inner wall 24 of the chamber 16 in FIG. 3 is now substantially cylindrical in shape for the major part. Furthermore, the surface 36 of the top 22 is of planar construction in this example.

Figure 4A:
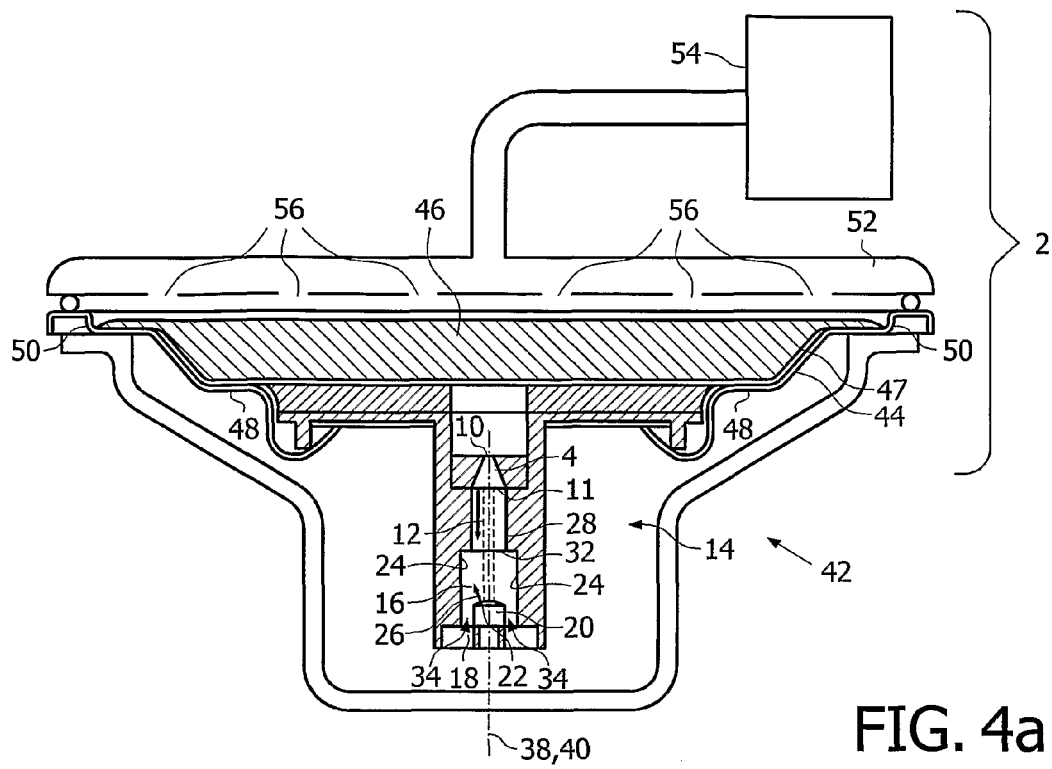
FIG. 4a is a cross-sectional view of a third embodiment of a device according to the invention, a unit according to the invention which is provided with a holder, a nozzle, and a receiving unit, and an assembly according to the invention which is provided with the unit, at least one pad being accommodated in the holder of the unit.
Figure 4B:
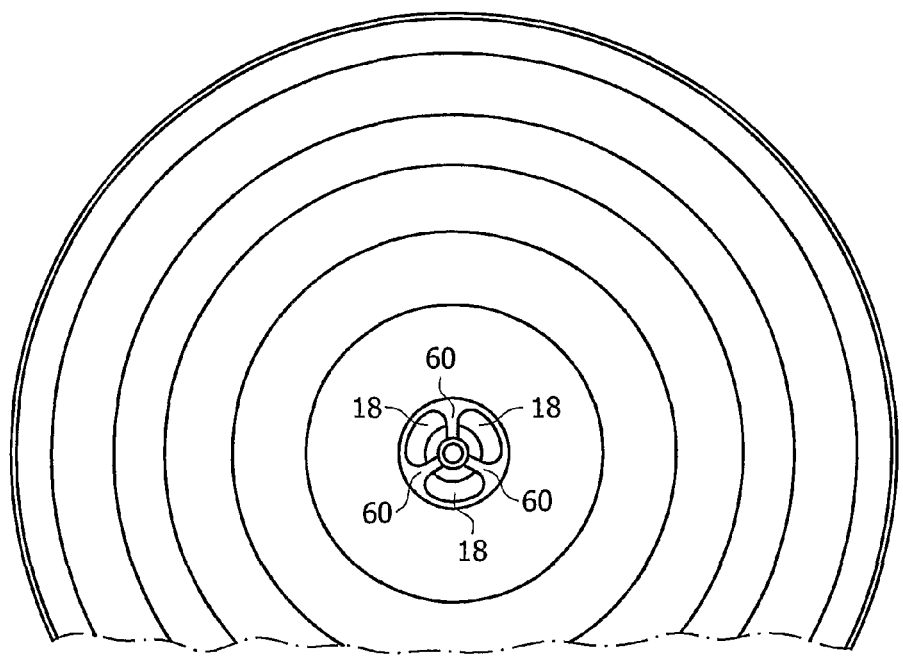

FIGS. 4a and 4b show an alternative embodiment of a device according to the invention. The device is provided with a unit 42 which comprises a receiving unit 14. Components of the receiving unit 14 corresponding to those of FIGS. 2 and 3 have been given the same reference numerals as in FIGS. 2 and 3. The unit 42 is furthermore provided with the nozzle 4. In addition, the unit 42 comprises a holder 44 for accommodating a pad 46 filled with a product to be extracted and/or dissolved, such as ground coffee and/or a dairy creamer. The holder 44 and the pad 46 may be of a type as described in European patent 904.717. The holder 44 is provided with a bowl-shaped inner space 47 which is bounded by a bottom 48 and an upright side wall 50. The upright side wall 50 extends around the bottom. The bottom and the upright side wall thus define a bowl-shaped inner space of the holder in which the pad is accommodated during use. The pad 46 extends over the bottom 48 up to the upright side wall 50. At least one drain opening, formed by the nozzle 4 in this example, is provided in the bottom 48. This drain opening forms an outlet of the holder. The inlet 10 of the nozzle in this example is accordingly in fluid communication with the outlet of the holder, because the inlet 10 and an outlet 11 of the nozzle constitute the outlet of the holder. In this example, moreover, grooves are provided in the bottom of the holder. The device 1 is further provided with a lid 52 with which the holder can be closed off. The device 1 also comprises a hot-water unit 54 for supplying hot water under pressure to an inner space of the lid 52. The lid 52 is provided with a number of outlet openings 56 at its lower side. Hot water is thus supplied through the outlet openings 56 at an upper side of the holder 44 during operation. The holder 44 and the hot-water unit 54 together form the beverage unit 2 of FIGS. 2 and 3. It further holds in this example that the receiving unit 14 and the holder 44 are mechanically interconnected. The nozzle 4 is mechanically connected to the holder 44. The nozzle 4, holder 44, and receiving unit 14 thus form a mechanical unit. The air 32 again flows through the drain opening 18 into the chamber 16. The jet impact member 20 in this example is connected to the chamber 16 by means of three lateral arms 60.

The pad 46 extends over the bottom 48 of the holder 44 up to the upright side walls 50 of the holder. The assembly of the pad 46 and the unit 42 also forms part of the invention.

The device of FIGS. 4a and 4b operates as follows. The hot-water unit 54 supplies hot water under pressure to the inner space of the lid 52. This hot water leaves the lid 52 under pressure through the outlet openings 56 of the lid 52. Hot water is thus supplied to the upper side of the holder 44. This water is pressed through the pad 46, which is filled with ground coffee in this example. A coffee extract is formed thereby which leaves the holder 44 through the nozzle 4. Since the coffee extract is supplied to the nozzle 4 under pressure, a jet of beverage is now formed. This jet 12 hits against the top 22 of the jet impact member 20 as discussed with reference to FIGS. 2 and 3. Air is supplied to the chamber 16 exclusively through suction of air via the drain opening 18. The beverage with the fine-bubble foam layer, in this example the coffee extract with the fine-bubble foam layer, leaves the chamber 16 through the drain opening 18. The drain opening 18 in this example is formed by the openings formed between the lateral arms 60.

FIGS. 5a and 5b show a fourth embodiment of a device according to the invention. Components corresponding to those of FIG. 4 have been given the same reference numerals. As in FIG. 4, the holder, the receiving unit comprising the chamber 16 and the jet impact member 20, and the nozzle 4 are mechanically interconnected into one unit 42. A first pad 46.1 is accommodated in the holder 44 in this example, resting on the bottom 48. A second pad 46.2 is present above the first pad 46.1, resting substantially on the first pad 46.1. The first pad 46.1 again comprises an envelope made of filter paper which in this example is filled with a soluble substance. The soluble substance in this example is a dairy creamer. The second pad 46.2 is also provided with an envelope of filter paper which in this example is filled with a product to be extracted. The product in this case is ground coffee. This is merely an example, however, thus it is alternatively possible for the first pad 46.1 to be filled with a soluble product and for the second pad 46.2 to be filled with a product to be extracted. Also, both the first and/or the second pad may be filled with a product to be extracted as well as a product to be dissolved.

Furthermore, the chamber 16 is provided with a product feed opening 32 through which the jet generated by a nozzle 4 is supplied to the chamber during operation. More in particular, the product feed opening 32 is formed by the nozzle 4 in this example.

It further holds that a space 60 within the chamber between the nozzle 4 and the jet impact member 20 is free from restrictions for a flow of the beverage between the nozzle and the jet impact member. This is in contrast to the device of FIGS. 2, 3, and 4, in which the channel 26 may be denoted a restriction.

Hot water is supplied to the lid 52 by the hot-water unit 54 during operation. This hot water is supplied under pressure through the openings 56 in the lid 52 to an upper side of the holder 44. This hot water will thus be pressed through the coffee pad 46.2. The coffee extract subsequently leaves the coffee pad at the lower side thereof and enters the milk pad 46.1. The dairy creamer present in the milk pad 46.1 will subsequently dissolve in the coffee extract. The coffee extract with the dairy creamer dissolved therein is subsequently supplied under pressure to the nozzle 4. A jet 12 of the beverage is created thereby which hits against the top of the jet impact member 20. The beverage with the fine-bubble foam layer, cappuccino in this example, will subsequently flow from the drain opening 18, exactly as in the examples described above. Air 34 will be supplied through this drain opening to the chamber, as discussed above.

FIGS. 6a and 6b relate to a fifth embodiment of a device according to the invention. This device largely corresponds to the device of FIGS. 5a and 5b. The holder 44, however, now accommodates a pad 46 filled with ground coffee. Another difference with the device of FIGS. 5a and 5b is that here the jet impact member is provided with an air supply channel 62 which extends from the exterior through the jet impact member into the chamber 16. The air supply channel comprises an inlet 63 situated outside the chamber. More in particular, two air supply openings 64.1 and 64.2 are provided in a side wall of the jet impact member, which openings are in fluid communication with the air supply channel 62. During operation, air (from outside the chamber), will only be supplied to the chamber 16 through the air supply channel 62 and (in this example also) via the drain opening 18. Air thus flows through the inlet 63 into the air supply channel and then enters the chamber through the air supply opening 64. Obviously, the side wall of the jet impact member may be provided with different numbers of air supply openings 64. What is relevant in this example is that it is provided with at least one air supply opening. The supply of air through the air supply channel 62 takes place exactly as discussed above. Since the beverage 26 with the fine-bubble foam layer flows from the chamber through the drain opening, an underpressure is created in the chamber 16 whereby air 34 is sucked on through the air supply channel 62 and through the drain opening 18.

Figure 7B:
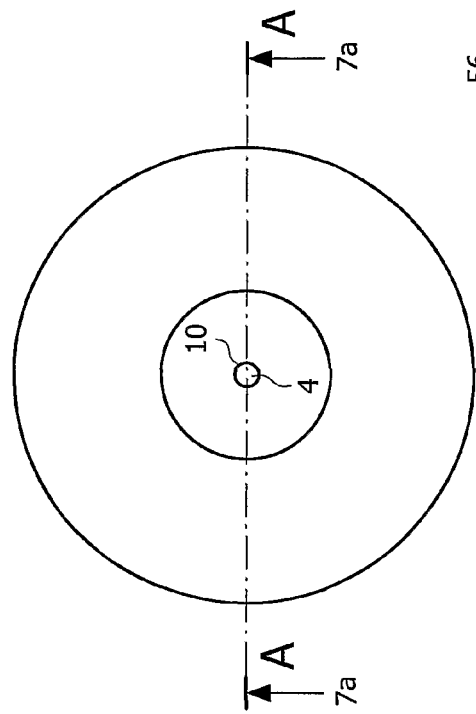
Figure 7A:
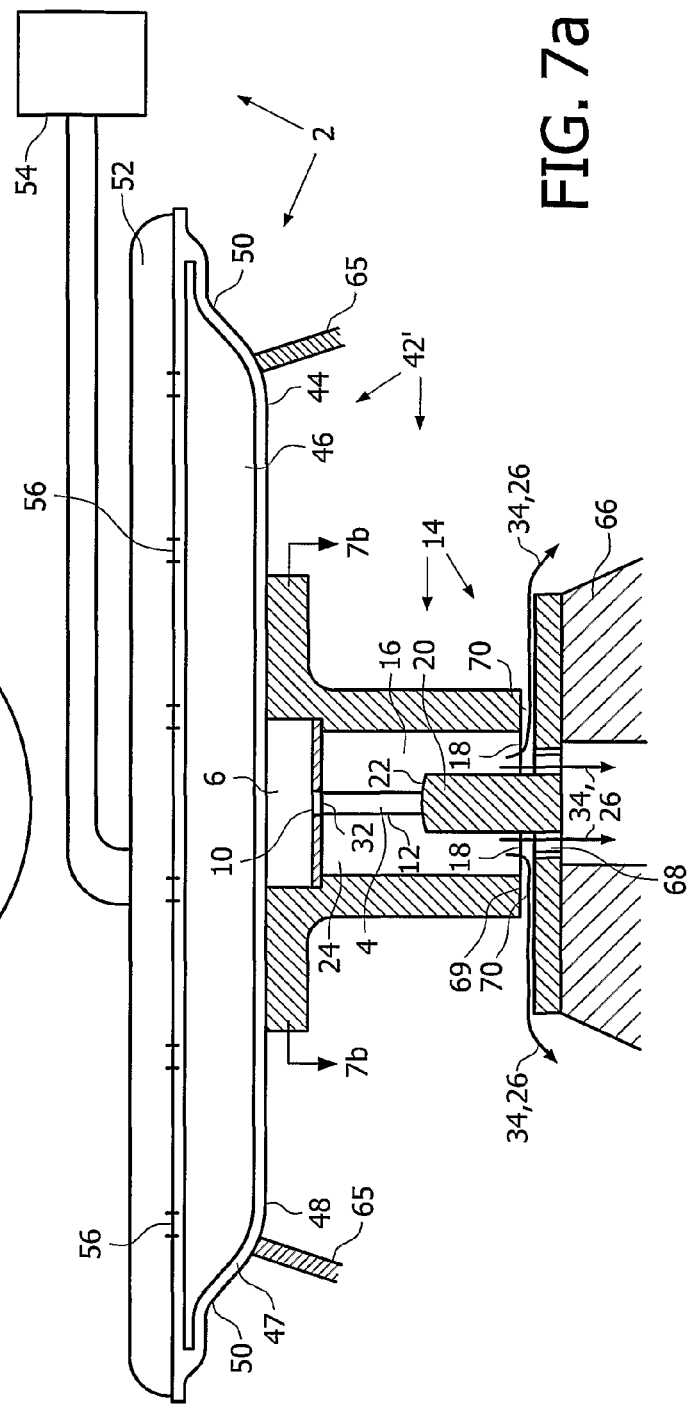
FIG. 7a is a cross-sectional view of a sixth embodiment of a device according to the invention, a unit according to the invention which is provided with a holder, a nozzle, and a chamber of a receiving unit, and an assembly according to the invention which is provided with the unit, at least one pad being accommodated in the holder of the unit.

FIGS. 7a and 7b show a sixth embodiment of a device according to the invention. This corresponds at least substantially to the embodiment of FIGS. 5a and 5b. A difference is again that only one pad is accommodated in the holder 44 in the form of a coffee pad as discussed with reference to FIGS. 6a and 6b. Another difference with the device of FIGS. 5a and 5b is that the jet impact member 20 is not connected to the chamber 16. The holder 44, the nozzle 4, and the chamber 16 are mechanically interconnected in this example so as to form a unit 42'. This unit 42' rests, for example, on support means 65 of the device. When the lid 52 is removed, the unit 42' can be lifted from a portion 66 of the device to which the jet impact member 20 is fixedly connected. The portion 66 of the device may additionally be provided with an inlet opening 68, while the jet impact member 20 is connected to said portion 66 of the device by means of lateral arms as discussed with reference to FIGS. 4a and 4b. It is furthermore apparent from FIG. 7a that a lower side 69 of the chamber 16 also lies free from the portion 66 of the device. The operation of the device of FIGS. 7a and 7b is fully similar to what was discussed with reference to FIGS. 5 and 6. The beverage leaving the drain opening 18 can flow away through the opening 68 in the device and/or through an intermediate space 70 between a lower side 69 of the chamber 16 and the portion 66 of the device. Air can be supplied to the chamber 16 exclusively through the drain opening 18 of the chamber. This air is then supplied to the drain opening 18 of the chamber via the opening 68 and/or via the intermediate space 70 between the chamber and the portion 66 of the device. It is also possible that the lower side 69 of the chamber will bear on the portion 66 of the device during operation, in which case the space 70 between the lower side 69 of the chamber and the portion 66 of the device is absent. In that case the beverage 26 flowing through the drain opening can flow away through the opening 68 in the portion 66 of the device. In that case air can only be supplied through the opening 68 and subsequently through the drain opening 18 to the chamber 16.

FIGS. 8a and 8b show a seventh embodiment of a device according to the invention. Again, components corresponding to those of FIGS. 2 to 6 have been given the same reference numerals. It is again true in the device of FIGS. 8a and 8b that the device is provided with a mechanical unit 42' composed of the holder 44, the nozzle 4, and the chamber 16. The jet impact member 20 again does not form part of this mechanical unit 42' and is fixedly connected to another portion 66 of the device. The jet impact member 20 in this example is again provided with an air supply channel extending through the jet impact member into the chamber 16. The preparation of the beverage takes place entirely as discussed above. The finished beverage 26 will again leave the chamber through the drain opening 18. In this example, the beverage now flows away through the intervening space 70 between the lower side 69 of the chamber 16 and the portion 66 of the device. Air is supplied to the chamber only through the air supply channel 62 and possibly in this example also, though to a lesser extent, through the at least one drain opening 18.

Figure 9:
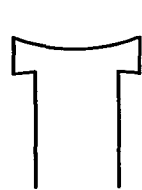
FIG. 9 shows a first alternative embodiment of a jet impact member that may be used in the devices of FIGS. 2 to 8 and 11.
Figure 10:
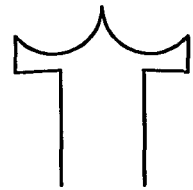
FIG. 10 shows a second alternative embodiment of a jet impact member that may be used in the devices of FIGS. 2 to 8 and 11.
Figure 11:
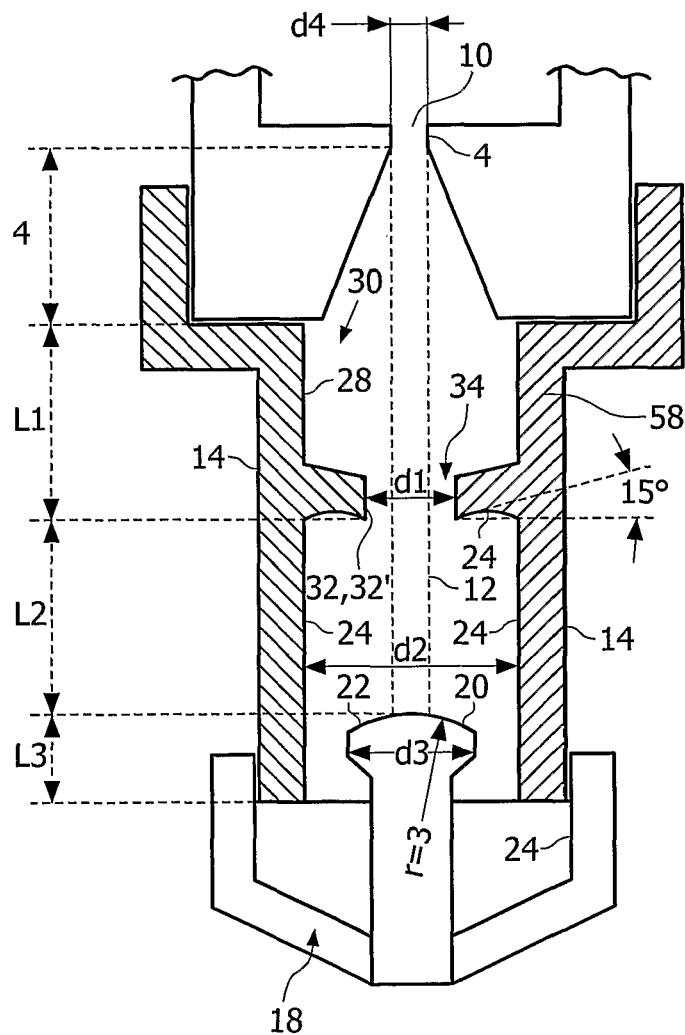
FIG. 11 shows an eighth embodiment of a device according to the invention for the preparation of a beverage suitable for human consumption and having a fine-bubble foam layer.

The invention is not limited to the embodiments discussed above. Thus a plurality of jets may impact on the jet impact member 20 instead of one jet. A plurality of nozzles 4, each directing a jet towards the jet impact member 20, may then be used. It is also possible for the nozzle 4 to be provided with a plurality of outlets for generating a plurality of jets. The plurality of jets may also be incident on a plurality of jet impact members accommodated in the chamber 16. The plurality of jets may alternatively be incident on one jet impact member. It is furthermore conceivable that the chamber is provided with a plurality of jet impact members 20 which are each hit by at least one jet originating from, for example, a plurality of nozzles or a single nozzle. It is also possible in the device of FIG. 4 that a fluid communication, for example in the form of a tube, is present between the outlet of the holder and the inlet of the nozzle. The jet impact member may have the shape of a planar plate, as was stated above. The top 22 may alternatively be convex as shown in FIG. 2, while holes running from top to bottom are provided in the top 22 adjacent an edge 23. The top 22 may also be concave, see FIG. 9. Furthermore, the top 22 may be concave along its outer circumference with a tip in the center, see FIG. 10. The receiving unit 14 may also be constructed as shown in FIG. 11. Further-more, the jet impact member may be replaced by a cylinder or tube in the device of FIGS. 2 to 8 and 11, extending in horizontal direction in the drawing between the walls 24 of the chamber. The portion of an outer side of the cylinder or tube against which the jet can hit will then form the top of the jet impact member which lies free from the walls 24. The diameter of the cylinder or tube may be, for example, equal to the diameter of the top in FIGS. 2 to 8 and 11.

Figure 12A:
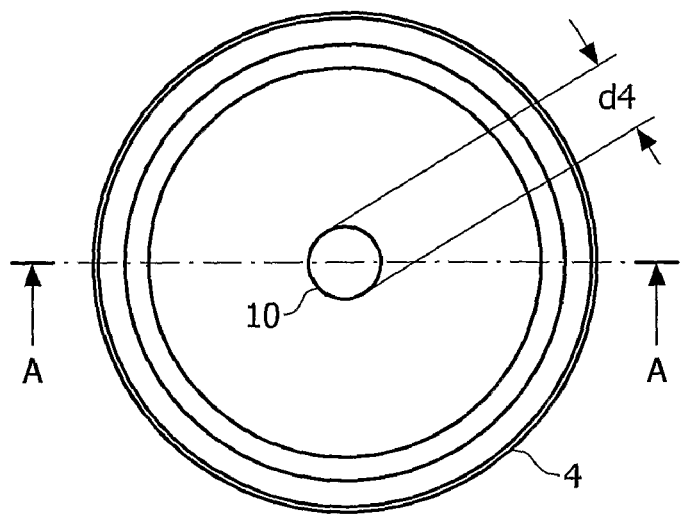
FIG. 12a is a plan view of a possible embodiment of a nozzle.
Figure 12B:
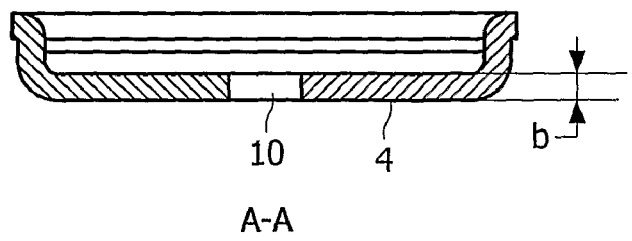

The nozzle may alternatively be formed, for example, by a nozzle as described in EP 1 092 377. The nozzle may also be formed by a plate 100 with an opening 102 as shown in FIGS. 12a and 12b. The thickness b of the plate is, for example, 0.1 to 0.5 mm, preferably 0.2 to 0.4 mm.

It is true then in FIG. 11, for example, that $d1<d3$.

It is also true, for example, that $d3<d2$ for each embodiment (cf., for example, FIGS. 3 and 11). It is also possible to opt for $d1=d2$, so that a space within the chamber between the nozzle and the jet impact member is free from restrictions for a flow of the beverage between the nozzle and the jet impact member. The channel 28 then in fact forms part of the chamber 14. The nozzle 4 now is the product feed opening of the chamber 14.

The following further remarks are particularly relevant.

The diameter of the jet when issuing from the nozzle may vary, for example, from 0.2 to 1.6 mm, more in particular from 0.4 to 1.4 mm, preferably from 0.6 to 1 mm, and more preferably from 0.7 to 0.9 mm. This diameter is approximately 0.8 mm in the present example.

The diameter of the top (for example d3 in FIG. 11) may vary, for example, from 1.4 mm to 10 mm, more in particular from 1.5 mm to 8 mm, preferably from 1.75 mm to 5 mm, and more preferably from 1.75 to 3.0 mm. This diameter is 2 mm in the example.

The diameter of the chamber at the area of the top (for example d2 in FIGS. 3 and 4) divided by the diameter of the top (for example d3 in FIGS. 3 and 11) is, for example, greater than 1.1, preferably greater than 1.2, and more preferably greater than 2.0. Said ratio is preferably approximately equal to 2.5. The ratio d2/d3 determines the extent of the outflow of the beverage. When this ratio is increased, more space is created for the supply of air, which leads to a coarser foam. When the diameter d2 remains the same and d3 is made greater, for example, the foam becomes finer. The ratio d2/d3 could be made variable in that the diameter d2 and/or the diameter d3 is made adjustable in a known manner. This adjusting possibility may also be achieved by means of a ring closed around the jet impact member, so that the diameter d3 is increased, or a ring fastened against the inner wall of the chamber, so that the diameter d2 is decreased. Various rings may thus lead to various diameters d2 and/or d3. It is also possible to change the size of the flow surface area between the inner wall and the jet impact member in other manners, for example a ring arranged between the jet impact member and the inner wall of the chamber, which ring lies free from the jet impact member and from the inner wall. The surface area through which the beverage can flow out will also be reduced if the jet impact member increases in diameter from the top in a direction towards the drain opening inside the chamber. The supply of air need not be affected thereby if the jet impact member is provided with said air supply channel.

Furthermore, the surface roughness of the jet impact member and/or the inner wall may be varied. A comparatively smooth surface, for example, could yield a finer foam than a surface that is comparatively rough. The chamber 16 need not be cylindrical or rotationally symmetrical, it may have alternative shapes. Thus a cross-section of the chamber perpendicular to the axis 40 may have, besides a circular shape, a triangular, rectangular, square, or any other, non-symmetrical shape.

The jet impact member 20 is in the center of the chamber 16 in the examples given. It is also conceivable, however, that the axis 48 of the chamber does not coincide with a center of the top of the jet impact member. It is accordingly also possible that the jet impact member, viewed in a plane perpendicular to the axis 40 of the chamber, is positioned out of center in the chamber, as long as the jet hits the jet impact member. In other words, the distance between the jet impact member and the chamber wall may vary. The chamber may also have a non-rotationally-symmetrical shape in this case, as discussed above.

Furthermore, it is true that said ratio may be, for example, smaller than 5. Said ratio may vary from 1.1 to 5, preferably from 1.5 to 4, and more preferably from 1.75 to 3. The top of the jet impact member may be made, for example, from POM, PP, ABS, or metal.

The diameter $d_4$ of the opening (inlet) 10 of the nozzle may vary, for example, from 0.3 to 1.5 mm, preferably from 0.6 to 1.0 mm, and more preferably from 0.7 to 0.9 mm. The term "nozzle" is understood to denote any means for generating a jet.

A greatest diameter $d_5$ of the chamber may be, for example, 1 to 4 times greater, preferably 1 to 3 times greater than the diameter $d_2$ of the chamber at the area of the top (cf., for example, FIG. 2). A diameter of the drain opening 18 of the chamber may vary, for example, from 3 mm to 15 mm, preferably from 2.5 mm to 8 mm, and more preferably from 4 mm to 6 mm.

The orientation of the devices of FIGS. 2 to 12 is not relevant. Thus the device of FIG. 4 may be tilted or even placed upside-down. The construction of the system will obviously have to be adapted in that case, as will be evident to those skilled in the art. The beverage supplied to the nozzle may also comprise a concentrate that is yet to be diluted with water after delivery by the device. The beverage suitable for consumption in that case is a concentrate yet to be diluted. The holders 44 discussed above may alternatively be provided with a filter bottom which is known per se, so that the holders 44 may be filled with loose products to be extracted, such as coffee and/or tea and/or other loose products to be dissolved such as a dairy creamer. A product to be dissolved in the present application is also deemed to denote other products such as a product for the preparation of cocoa and flavoring agents. A product to be extracted may also be a product other than coffee or tea.

Such modifications are all deemed to fall within the scope of the invention.

The invention claimed is:

1. A device for preparing a beverage, comprising:
   a beverage unit supplying the beverage under pressure,
   a nozzle in fluid communication with the beverage unit such that the nozzle generates a jet of the beverage, and
   a receiving unit into which the jet is directed, the receiving unit comprising:
   a chamber having a drain opening and a channel extending to the nozzle, and
   a jet impact member disposed within the chamber and having a top which does not contact an inner wall of the chamber,
   wherein the nozzle and the jet impact member are mutually oriented such that the jet hits against at least a portion of the top of the jet impact member so that the beverage, after hitting against the jet impact member, leaves the chamber through the drain opening in the form of the beverage having a foam layer, wherein air can be supplied to the chamber exclusively through the drain opening.

2. A device as claimed in claim 1, wherein the chamber further comprises a product feed opening through which the jet enters the chamber.

3. A device as claimed in claim 2, wherein the product feed opening is formed by the nozzle.

4. A device as claimed in claim 3, wherein a space within the chamber between the nozzle and the jet impact member is unobstructed.

5. A device as claimed in claim 2, wherein the top of the jet impact member is disposed between the product feed opening and the drain opening.

6. A device as claimed in claim 2, wherein the top of the jet impact member is directed towards the product feed opening.

7. A device as claimed in claim 2, wherein a line that is perpendicular to a center of a surface of the top of the jet impact member is directed towards the product feed opening.

8. A device as claimed in claim 2, wherein a line that is perpendicular to a surface of the top of the jet impact member in a location where the jet hits the top of the jet impact member is directed towards the product feed opening.

9. A device as claimed in claim 1, wherein the top of the jet impact member is directed towards the nozzle.

10. A device as claimed in claim 1, wherein a line that is perpendicular to a surface of the top of the jet impact member in a location where the jet hits the top of the jet impact member is directed towards the nozzle.

11. A device as claimed in claim 1, wherein a line that is perpendicular to a surface of the top of the jet impact member in a location where the jet hits the top of the jet impact member is directed parallel to the jet.

12. A device as claimed in claim 1, wherein a surface of the top of the jet impact member is one of concave, convex, and planar.

13. A device as claimed in claim 1, wherein the top of the jet impact member is located in a center of the chamber, as viewed in a plane transverse to the jet.

14. A device as claimed in claim 1, wherein the top of the jet impact member is located on a central axis of the chamber.

15. A device as claimed in claim 1, wherein an axial direction of the jet impact member extends in a longitudinal direction of the chamber.

16. A device as claimed in claim 1, wherein the inner wall of the chamber is rotationally symmetrical in shape.

17. A device as claimed in claim 16, wherein the inner wall of the chamber is substantially rotationally symmetrical in shape about an axis of rotation which extends in a longitudinal direction of the chamber.

18. A device as claimed in claim 17, wherein the axis of rotation extends through the top of the jet impact member.

19. A device as claimed in claim 16, wherein the inner wall of the chamber is at least partially cylindrical in shape.

20. A device as claimed in claim 1, wherein the jet impact member is connected to the chamber by a lateral arm.

21. A device as claimed in claim 1, wherein the beverage unit further comprises:
    a holder containing a product to be one of extracted and dissolved; and
    a hot-water unit supplying hot water to the holder to produce the beverage.

22. A device as claimed in claim 21, wherein the chamber and the nozzle are connected to the holder.

23. A device as claimed in claim 22, wherein the jet impact member is connected to the holder.

24. A device as claimed in claim 22, wherein the jet impact member is not directly connected to the holder.

25. A device as claimed in claim 22, wherein the chamber and the nozzle are integrated with the holder.

26. A device as claimed in claim 23, wherein the jet impact member is integrated with the holder.

27. A device as claimed in claim 1, characterized in that the jet, after hitting the jet impact member, forms a mist of the beverage which flows against and/or along the inner wall of the chamber and subsequently leaves the chamber through the at least one drain opening in the form of the beverage with the ifne-bubble foam layer.

28. A device as claimed in claim 21, wherein the product is one of coffee, tea, and non-dairy creamer.

* * * * *